Aug. 7, 1956     R. L. HOLLOWAY     2,757,510
THRUST CONTROL MECHANISM FOR JET-PROPELLED AIRCRAFT
Filed Oct. 14, 1953     7 Sheets-Sheet 1

INVENTOR.
ROBERT L. HOLLOWAY
BY George S. Hastings
Attorney.

Aug. 7, 1956

R. L. HOLLOWAY

2,757,510

THRUST CONTROL MECHANISM FOR JET-PROPELLED AIRCRAFT

Filed Oct. 14, 1953

INVENTOR.
ROBERT L. HOLLOWAY
BY
George Hastings
Attorney.

Aug. 7, 1956  R. L. HOLLOWAY  2,757,510
THRUST CONTROL MECHANISM FOR JET-PROPELLED AIRCRAFT
Filed Oct. 14, 1953  7 Sheets-Sheet 5

INVENTOR.
ROBERT L. HOLLOWAY
BY George S Hastings
Attorney.

INVENTOR.
ROBERT L. HOLLOWAY

Aug. 7, 1956

R. L. HOLLOWAY

2,757,510

THRUST CONTROL MECHANISM FOR JET-PROPELLED AIRCRAFT

Filed Oct. 14, 1953

INVENTOR.
ROBERT L. HOLLOWAY
BY Georges Hastings
Attorney.

United States Patent Office 2,757,510
Patented Aug. 7, 1956

2,757,510

THRUST CONTROL MECHANISM FOR
JET-PROPELLED AIRCRAFT

Robert L. Holloway, Snyder, N. Y., assignor to American Machine & Foundry Company, a corporation of New Jersey Application October 14, 1953, Serial No. 385,921

8 Claims. (Cl. 60—35.54)

This invention relates to jet propulsion means. More particularly, it relates to a structure for controlling the direction of thrust of a jet propulsion engine.

In the operation of aircraft having jet propulsion, it is desirable that the pilot be able to vary quickly the amount of forward thrust delivered by the jet engine. Attempts to control forward thrust by throttling down the engine have been unsatisfactory, as it requires an appreciable time to restore full thrust to a jet aircraft after the thrust has been diminished by this method due to high rotational inertia of the engine. Yet occasions often arise where it is necessary to restore quickly the full thrust almost instantaneously.

Mechanical systems have heretofore been proposed for varying or reversing the forward thrust on jet propulsion motors. However, such systems have been either very complicated to operate, have increased the wind resistance on the airplane, have provided only a small percentage of reverse thrust, or have reduced the forward thrust appreciably.

It is, therefore, an object of this invention to provide a jet thrust control system for varying the jet stream from full forward thrust to completely reversed thrust within a short interval of time, while the engine is operating at substantially full power.

It is a further object of the invention to provide a jet thrust control system for varying the jet stream from full forward thrust to full reverse thrust in infinitely variable fashion.

Another object of the invention is to provide a jet thrust control system for aircraft which contributes negligible loss in forward thrust or additional drag or wind resistance to the aircraft to which it is attached.

It is yet another object of the invention to provide a jet thrust control system light in weight and easily adaptable to substantially all types of jet propulsion engines.

A still further object of this invention is to provide a jet thrust control system for aircraft having means for utilizing the jet thrust as a brake, whereby the maneuverability of the aircraft is greatly increased and, conversely, the need for large capacity mechanical brakes is reduced.

For a better understanding of the invention, together with other and further objects thereof, reference is made to the following detailed description taken in connection with the accompanying drawings, in which.

Figure 1:
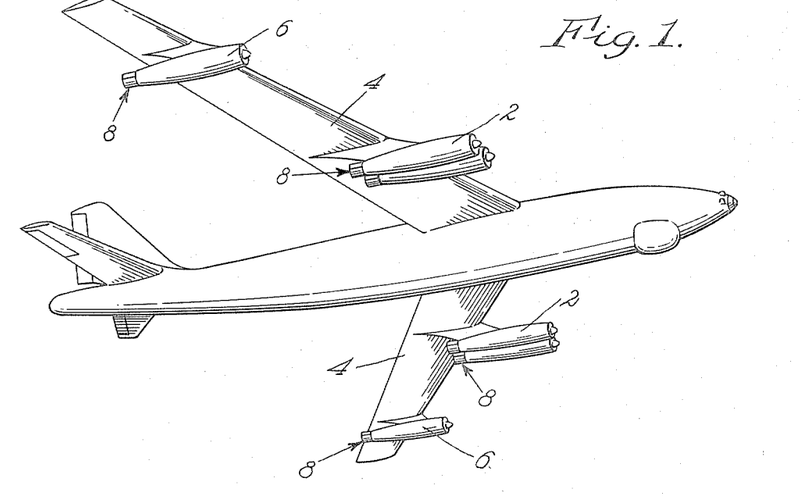
Fig. 1 is a perspective view of an aircraft having jet propulsion engines employing the thrust control system of the present invention.

Referring now to the drawings, in Fig. 1 is shown an airplane propelled by jet engines which embody the principles of the present invention. A pair of twin jet engines 2 are mounted on the inboard sides of wings 4 and a single jet engine 6 is shown mounted near the outer tips of the wings. Each of the jet engines has a thrust controller, generally indicated by reference numeral 8, attached to the rear portion thereof. As substantially all of the structure for operating the thrust controller 8 is mounted within the body of the jet propulsion motor or fairing thereof, the operating mechanism will not appreciably affect the air resistance of the aircraft. Although the exterior surfaces of thrust controller plates 10, described in more detail below, are in contact with the air stream, their diameter is substantially no greater than the diameter of the jet nozzles, and being merely rearward extensions thereof, they offer no appreciable air resistance.

Figure 2:
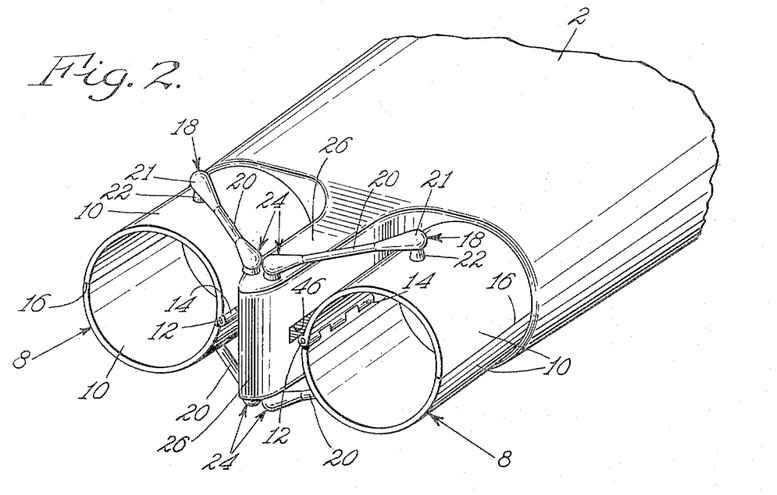
Fig. 2 is a rear perspective view of a twin jet engine illustrating the thrust reversal mechanism in forward thrust position.
Figure 3:
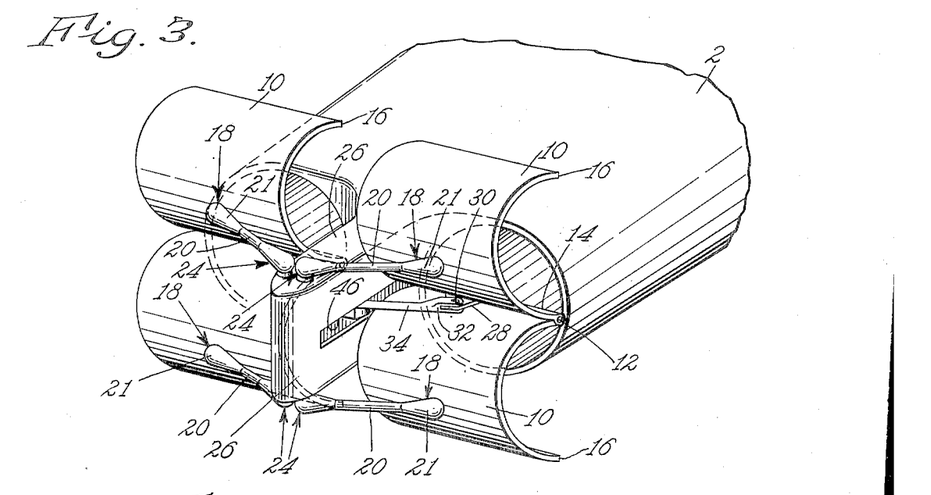
Fig. 3 is a perspective view of the rear portion of the twin jet nozzles showing the thrust control mechanism in reverse thrust position.
Figures 4, 5:
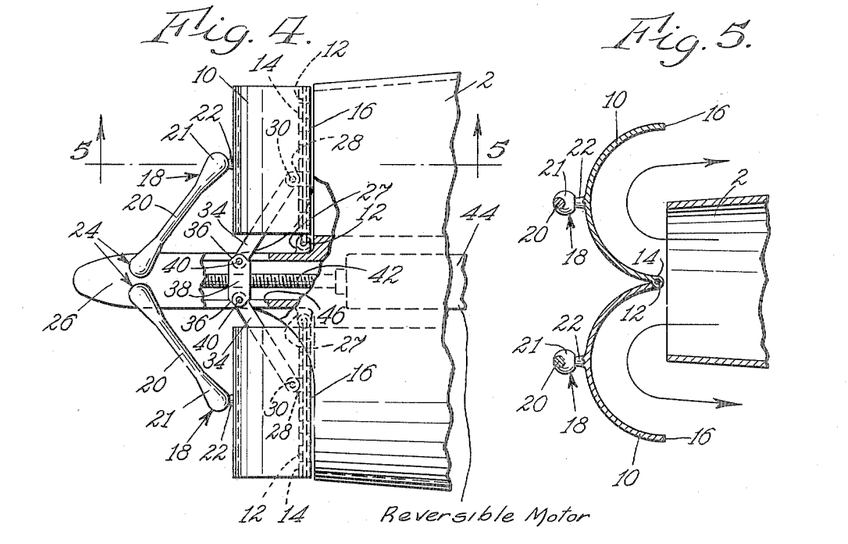
Fig. 4 is a plan view of the thrust control mechanism in reverse thrust position.
Fig. 5 is a sectional side elevation taken along the line 5—5 of Fig. 4.

Referring now to Figs. 2, 3, and 4 wherein a jet control mechanism for a pair of twin jet reaction motors is shown in greater detail, the exhaust or ejection nozzles of twin jet engines 2 have mounted in axial alignment and as segmented extensions thereof, semi-cylindrical half sections or shells 10 of thrust controller 8. In order to provide a complete reversal in the direction of propelling gas flow from the pair of jet nozzles 2, it is necessary that the cylindrical half shells completely extend across the mouths of the twin jet nozzles. The longitudinal length of each half shell 10 need be no longer than the diameter of its associated nozzle or tail pipe. By thus restricting the length of the shells, minimum interference with the forward thrust of the jet stream is assured. Although it is preferable that the movable half sections have a cylindrical configuration, since this configuration provides the most compact arrangement which will encompass a given jet air mass flow, yet the half sections may be any other suitable shape as desired.

Each pair of cylindrical half sections are separable, but are pivotally connected along one longitudinal edge by means of hinge pins 12 and hinges 14. The other longitudinal edges 16 of half sections 10, opposite to pivot pin 12 and shown held in register with one another in Fig. 2, are unconnected in order that they may be freely separated. Centrally attached to the upper and lower peripheral surfaces of each half section 10 are universal ball and socket joints 18. Although a ball and socket joint having a universal type action is shown, yet it is understood that any other suitable joint may be used.

Movably fastened to the ends of outwardly extending arms 20, are axially rotatable, swivel sockets 21, for receiving ball mounts 22 of ball and socket joints 18. The inner ends of arms 20 are similarly held by means of swivel ball and socket joints 24 attached to the rear portion of slotted extension structure 26 of the jet engines 2, which in the illustrated embodiment is hollow.

Laterally disposed on each side of structure 26 and in a plane with hinges 14 are outwardly extending ears 27, to which are pivotally secured one end of each of hinge pins 12. The pivoted joints allow oscillating movement of half sections 10, but at the same time serve to aid in supporting and holding the half sections in proper alignment at all times with the mouths of jet nozzles 2. While the joint shown is the preferred means of providing a pivoted mount for shells 10, yet any other suitable joint may be used if desired.

Centrally attached to hinges 14 are lugs 28. Each lug has an aperture therein for receiving pivot pin 30. Pivotally attached to lugs 28 by means of pivot pin 30 and having a yoked end member 32 are outwardly extending arms 34. The inner ends of arms 34 are pivotally attached to apertured ears 36 of nut 38 by means of pivot pins 40. Arms 34 serve both to add support to shells 10, and to translate axial movement of nut 40 into lateral movement of the shells.

Nut 38, with threads cut therein engages with a threaded shaft 42 and is free to move lineally in a direction parallel to the longitudinal axis of the jet motors 2 when shaft 42 is rotated. Rotation of shaft 42 is provided by means of an actuating member 44 connected to a suitable remote control unit. Actuating member 44 may be a suitable electrically energized motor, or a hydraulic actuating unit may be used if desired. The centrally positioned structure 26 of the jet nozzles is hollow in cross section and providing a housing for the shaft 42 and movable nut 38. Housing 26 also has a pair of slots 46 to allow outwardly extending arms 34 to move freely therein.

Figures 6, 7:
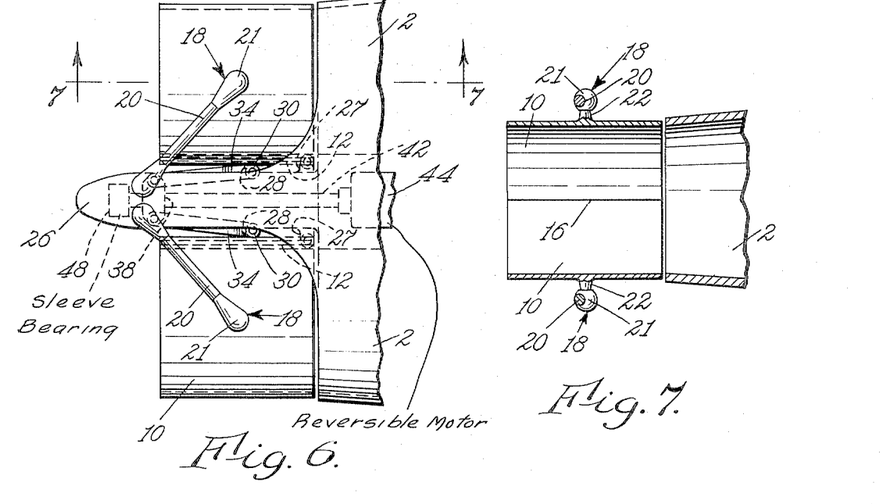
Fig. 6 is a plan view of the jet control mechanism in forward thrust position.
Fig. 7 is a sectional side elevation taken along the line 7—7 of Fig. 6.

As the shaft 42 and its associated movable nut 38 bear substantially all of the weight of the thrust controller plates 10, the shaft is supported by conventional sleeve bearings 48 as shown in Fig. 6. The bearing, which is suitably mounted within housing 26 also serves to insure that shaft 42 is centrally positioned midway between each nozzle of the twin jet motors 2.

Figures 8, 9, 10:
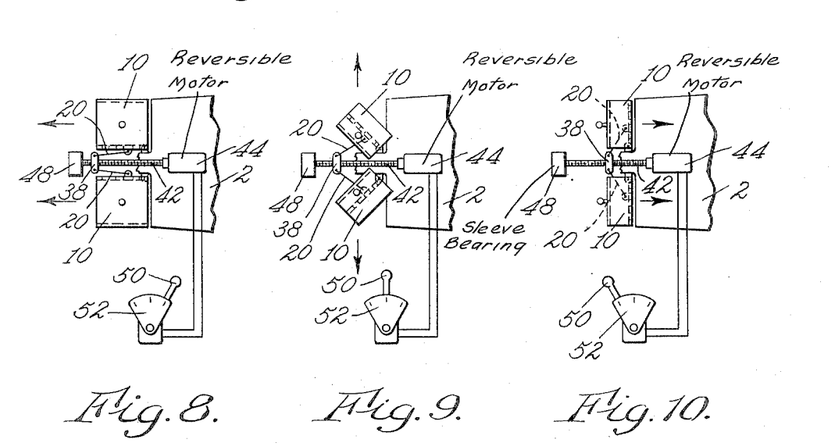
Figs. 8, 9, and 10 illustrate in schematic form, successive steps in the operation of the thrust control mechanism.
Figure 11:
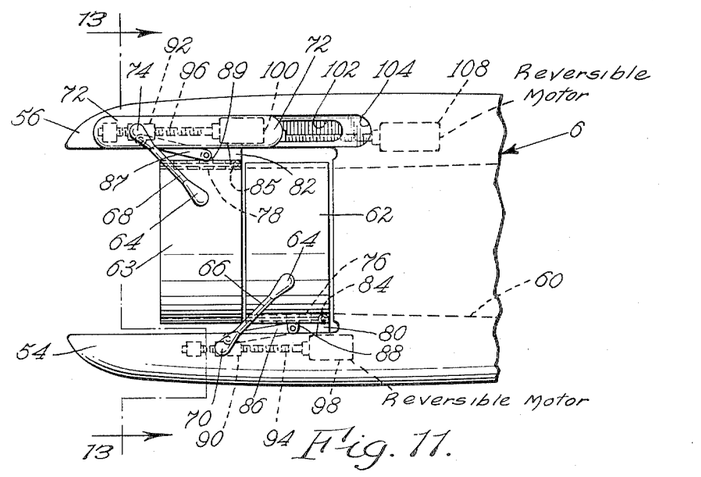
Fig. 11 is a plan view of the rear portion of a single jet nozzle, illustrating a modified thrust control mechanism in forward thrust position.
Figure 12:
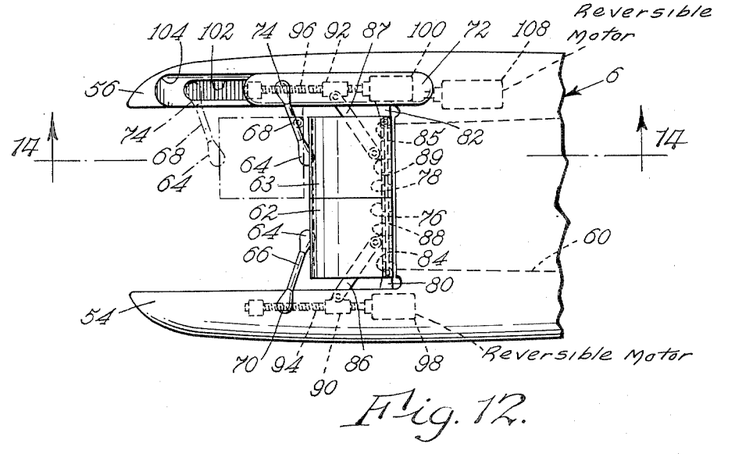
Fig. 12 is a plan view of the rear portion of a single jet nozzle, illustrating a modified thrust control mechanism in reverse thrust position.
Figure 13:
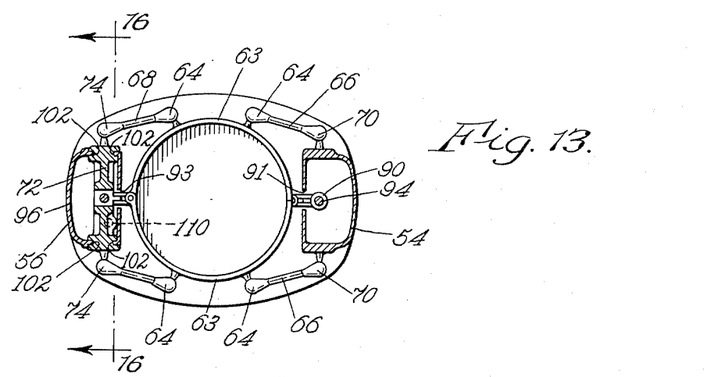
Fig. 13 is an end elevation of the single engine thrust control mechanism partly in section, taken on line 13—13 of Fig. 11.
Figures 14, 15, 16:
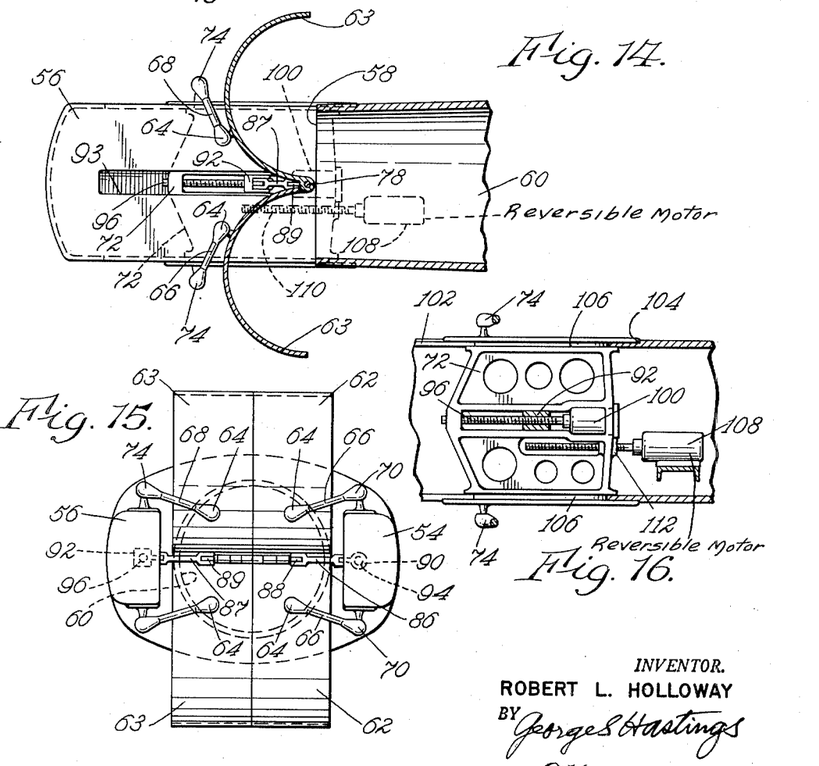
Fig. 14 is a sectional side elevation taken on line 14—14 of Fig. 12.
Fig. 15 is a rear view of a single jet engine thrust control mechanism in reverse thrust position.
Fig. 16 is a sectional side elevation taken on line 16—16 of Fig. 13, illustrating a portion of the thrust control operating mechanism.

Figs. 8, 9, and 10 schematically illustrate the operation of the thrust controller. Motor 44, which is of the reversible type, may be connected to a suitable remote control box 52 located in the pilot's compartment and actuated by control lever 50. For purposes of illustration, control lever 50 is shown in a right hand or forward position when unimpeded or forward thrust is desired. In this position semi-cylindrical shells 10 are retracted so that edges 16 are in register with each other, thus forming a pair of cylindrical extensions to the nozzles of jet propulsion engines 2. As all of the actuating mechanism of the thrust controller is external to the stream of jet gases, the thrust deflecting system offers no impedance to the flow of gases through the engine when in a normal or forward thrust position, with cylindrical shells 10 acting merely as extensions to the jet nozzles, as shown in Fig. 7.

When control lever 50 is moved from the forward thrust position, the reversible motor 44, actuated by a suitable control means which may be contained in box 52, begins to rotate shaft 42. Rotation of shaft 42 causes travelling nut 38 to move forwardly towards motor 44. Yoked arms 34 are then forced to move outwardly from shaft 42, thereby causing cylindrical half sections 10 to begin to separate. As each half section is connected to structure 26 by means of universal ball and socket joints 18, arms 20, ball and socket joints 24, and pivoted ears 27, lateral movement of the separable cylinders as an integrated whole is prevented when nut 38 is caused to travel forwardly. Instead each half shell is caused to unfold and at the same time rotate about a transverse axis, for the following reasons.

Forward and outward movement of arms 34 causes the hinge lines 14 to rotate horizontally about their pivoted ends. Due to the fact that arms 20 are not extensible, the shells 10 are forced to open along longitudinal edges 16, since the center point of each half shell where ball mount 22 is attached is restricted to movement along an arc having a radius equal to the length of arms 20.

Unfolding of the half shells 10 from the retracted position shown in Fig. 8 is substantially proportional to the outwardly extending movement of guiding members 20. Thus a position will be reached during the travel of the deflecting plates from forward to reverse thrust position, wherein the jet stream gases are deflected laterally. An intermediate position of substantially zero thrust as shown in Fig. 8 is thereby obtained.

If control lever 50 of remote control mechanism 52 is moved to a rear or lefthand position as shown in Fig. 10, the actuating member 44, in response to a signal from the remote control mechanism, causes travelling nut 38, by rotating threaded shaft 42, to move to its final forward position. After this point is reached, the remote control mechanism 52 automatically stops further rotation of shaft 42, thereby causing the deflecting shells 10 to be maintained in the reverse thrust position.

When the travelling nut 38 has reached the point shown in Fig. 10, the fully extended cylindrical half sections are positioned perpendicular to the direction of flow of jet gases through the nozzles of jet motors 2. In this position, hinges 8 are diametrically disposed across the mouths of the jet nozzles. The flow of gas then completely reverses its direction and passes forwardly over the outer surfaces of jet propulsion motors 2, as shown in Fig. 5. Symmetry in the reverse thrust is achieved, as the gas stream is divided into two portions which are deflected equally over the upper and lower portions of the jet engine fairing.

Although Figs. 8, 9, and 10 illustrate only three positions of the thrust deflector shells 10, yet the shells may be moved to any position between full forward and full reverse thrust as selected by actuating control lever 50. An infinitely variable control over the direction of jet thrust is therefore available.

The jet controlling system just described may be adapted with some modification to a single engine system. In general, essentially the same supporting and actuating mechanism as utilized in the twin jet embodiment may be employed for single jet control. However, as the thrust forces of a single jet engine deflecting system, transmitted to the actuating mechanism, are not balanced by equal and opposite forces from an adjacent jet motor, as in the case of a thrust controlling system for twin jet engines, it is preferable to provide a symmetrical arrangement for such a single engine system. One embodiment of a symmetrical arrangement is illustrated in Figs. 11 through 16 wherein a single jet engine is provided with half shells having an axial length equal to the radius of the jet nozzle, or only one-half the length of a deflector shell of the type employed in a twin engine system. The thrust forces exerted by each pair of deflecting shells against the actuating mechanism will then be reduced by a factor of two and will result in symmetrical reversal of direction of thrust.

While each pair of half shells for the single engine embodiment requires a separate actuating mechanism, yet, since the total thrust forces on each mechanism are reduced, the components therefor may be of a reasonable size and strength without impairing the safety factor of the mechanism. Of course, while it is preferable to use two pairs of deflecting plates and associated mechanisms for each, it is understood that a single pair of deflecting plates operated by a single actuating mechanism may be used if desired.

Figs. 11 through 16 illustrate in detail one embodiment of a jet control structure adapted for use on a single jet propulsion engine. Single jet engine 6 has a pair of rearwardly projecting structures 54 and 56 which serve as supporting structures or housings for the actuating mechanisms of jet deflecting plates or shells 62, 63. For the reasons given above, each pair of deflecting shells, which, when retracted and in a forward thrust position, form a nozzle extension of cylindrical configuration, has a longitudinal length equal to only one-half the diameter of the jet nozzle 60. Of course, the diameter of each cylindrical nozzle extension is at least equal to the diameter of mouth 58, so that the flow of gases supplying the forward thrust are not impeded.

Attached to the outer periphery of each pair of cylindrical half sections 62, 63 by means of universal ball and socket joints 64 are outwardly extending arms 66 and 68, respectively, which are terminated at the ball receiving ends by swivel mounted sockets similar to the swivel socket 21 of the twin jet embodiment. Arms 66 are also fastened to housing 54 by means of ball and socket joints 70, whereas arms 68 are mounted on slidable member 72 by means of ball and socket joints 74. Each pair of cylindrical half shells 62, 63 are separable, but are connected longitudinally along one peripheral edge by hinges 76, 78. Attached to one end of each hinge by means of suitable brackets or ears and pivot pins are pivot joints 84, 85. Each joint pivots about its respective lugs 80, 82. Lug 80 is mounted forwardly on the inward side of housing 54, whereas lug 82 is mounted forwardly on movable track member 72.

Outwardly extending arms 86, 87 are pivotally attached to the central point of hinges 76, 78 by means of suitable lugs and bifurcated end members which comprise pivoted joints 88, 89. The opposite ends of arms 86, 87 pass through slots 91, 93 in housings 54, 56 and are pivotally fastened to movable nuts 90, 92, respectively. Each nut has threads cut therein for engaging with threads on rotatable shafts 94, 96. Suitable end bearings are provided for supporting shafts 94, 96, and each shaft is rotated by its individual reversible, actuating members, 98, 100, respectively, which may be electric motors, hydraulic units or other suitable actuating means. Conventional remote control means, not shown, for allowing the pilot to control the actuating members may be connected to each motor, similar to the twin jet arrangement shown in Figs. 8 to 10.

In a forward thrust position, pairs of half sections 62, 63 are arranged one behind the other so that their longitudinal axes are in alignment. Therefore, when a reverse thrust position is desired, the shells must not only be unfolded and rotated, but half shells 63 must also be moved forward from their forward thrust position, shown in Fig. 11, to the reverse thrust position of Fig. 12. Forward movement of half shells 63 and their associated actuating mechanism is therefore provided by slidable track member 72, which slides along tracks 102 of housing 56.

Tracks 102 may comprise the edges of slots 104 cut into the top and bottom surface of housing 56, and stepped so as to engage properly, complementary grooves 106 of slidable member 72. A conventional, reversible motor 108 is provided for sliding member 72 along tracks 102 by rotating threaded shaft 110 in threaded bearing 112. A remote control unit for pull-up motor 108 may be connected to the pilot's thrust control box so as to provide proper forward or reverse movement of member 72 automatically, when motors 98 and 100 are actuated. While half shells 63 are illustrated as being moved forward by means of a track and sliding member 72, yet it is understood that any other means for moving the deflector plates, such as a gear rack arrangement or other suitable linkage may be employed, and also, if desired, other arrangements of the half shells, while in the retracted, forward thrust position, such as stacking them in an interleaved fashion, may be used.

Operation of the single, jet thrust control system is very similar to the operation of a twin jet system, except for the additional step of moving deflector plates 63 forwardly towards mouth 58 in an extended position, when reverse thrust is required.

Thus, when a change in forward thrust is desired, the pilot, by actuating a remote control mechanism in the pilot's compartment, causes motors 98, 100 and 108 to be energized. Shafts 94, 96 and 110 are then rotated, thereby moving nuts 90, 92 and bearing 112 forwardly and causing arms 86, 87 to extend outwardly. Cylindrical half shells 62, 63 then rotate in a horizontal plane about their respective pivoted joints 84 and 86, and simultaneously begin to open vertically due to the fact that the force exerted on hinge pivots 88, 89 by actuating arms 86, 87 is opposed by rigid members 68, which rotate about their ball joints while forcing the attached half shells to separate.

Motor 108 is synchronized with the rotation of shaft 94, 96 so that as half shells 62, 63 begin to separate, sliding member 72 is pulled forward. Its progress is so synchronized that both pairs of shells are fully opened before shells 63 are moved to their final positions athwart the jet stream. Thus, by rotating shafts 94, 96, 110, both pairs of deflector plates 62, 63 are opened vertically and rotated about their pivoted ends, while half shells 63 are moved forward concurrently, so that in full reverse thrust position the sides of the deflector plates are arranged at right angles to the jet streams. The direction of jet gas flow is therefore reversed and forced to pass forwardly over the outer surfaces of the jet engine to provide full thrust reversal. By adjusting controller plates 62, 63 to various positions wherein the mouth of the nozzle is only partially covered, any degree of thrust from full forward to zero thrust is therefore obtainable.

Figures 17 through 22 illustrate in detail another embodiment of the jet control structure adapted for use on a single jet propulsion engine, wherein symmetry of construction and symmetry of the thrust reversal is obtained through the use of a single pair of half shells.

Single jet engine 6 has a pair of rearwardly projecting structures or fairings 114, which serve as supporting structures for the actuating mechanism of jet deflecting plates or shells 116 and 118. As in the twin engine embodiment, each pair of deflecting shells has a longitudinal length substantially equal to the diameter of the jet nozzle orifice 120. Similarly the diameter of each cylindrical nozzle extension when folded in the retracted position, is at least equal to the diameter of mouth 120 so that the flow of gas supplying the forward thrust is not impeded by the tail pipe extension.

Attached to the outer periphery of each shell or cylindrical half sections 116 and 118 by means of universal ball and socket joints 122 are outwardly extending arms 124 which are terminated at the ball receiving ends by swivel mounted sockets similar to the swivel socket 21 of the twin jet embodiment. Arms 124 are also fastened to structures 114 by means of swivel mounted, ball and socket joints 126. Each half shell has a boss 128 formed along one longitudinal edge thereof, through which is passed a pivot pin 130. Attached to one end of each pin is a lever arm 132, preferably of the bell crank type, which is pivotally mounted on laterally extending lug 134 by means of pivot pin 135. Each bell crank lever 132 has its other end pivotally fastened to an actuating arm 136 by means of a yoked end member 139 and a pivot pin 141, which comprise knee joints 137. Actuating arms 136 supported by bearings 138 are extended rearwardly by means of operating mechanisms 140 which may be operated hydraulically or by any other suitable means.

Each actuating mechanism is pivotally attached to one of lugs 142 by means of pivot pins 144 so that knee joint 137 may bend freely when arms 136 are extended. Slots 146 are provided in fairings 114 to allow knee joints 137 to protrude outwardly when the actuating arms are in an extended position. The actuating mechanisms 140 may be connected to suitable remote control devices similar to that utilized in the twin jet arrangement shown in Fig. 8, by means of control lines 147.

Figure 17:
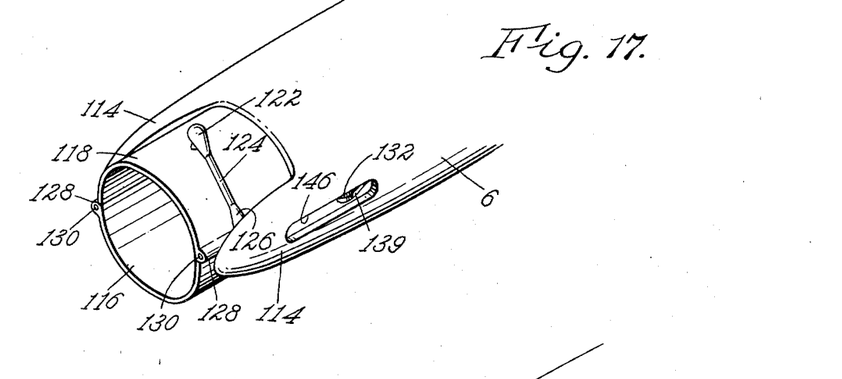
Fig. 17 is a perspective view of the rear portion of a jet nozzle illustrating another embodiment of the thrust control mechanism for a single jet engine in forward thrust position.

In a forward thrust position as shown in Fig. 17, the half shells 116 and 118 are retracted so that their longitudinal edges are in register with one another, thus forming a cylindrical extension to the nozzle of jet propulsion engine 6. As in the previously described embodiments, all of the actuating mechanisms of the thrust controller are external to the stream of the jet gases, thus offering no impedance to gas flow through the engine when in a normal thrust position.

When a change in thrust is desired, a conventional remote control means, not shown, actuates hydraulic cylinders 140, thereby causing arms 136 to travel rearwardly or forwardly, depending on the amount of reverse desired. Bell crank 132 is thus pivoted about lug 134 through knee joint 137. When greater reverse thrust is desired, movement of bell crank arm 132 outwardly towards slots 146 will cause half shells 116 and 118, respectively, to rotate inwardly towards the mouth 120 of jet engine 6. However, as supporting arms 124 are not extensible, each half shell will be pivoted about its associated boss 128 and pivot pin 130. Movement of the half shells in a horizontal plane is thereby coupled with a simultaneous movement in a vertical plane so that in a full reverse thrust position the deflecting plates 116 and 118, respectively, have their bossed edges adjacent one another and diametrically disposed across the mouth 120 of jet engine 6.

Figure 18:
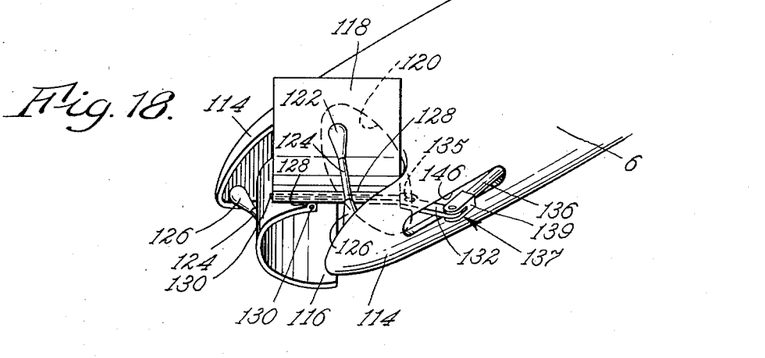
Fig. 18 shows the thrust control mechanism of Fig. 17 in a partially reversed thrust position.
Figure 19:
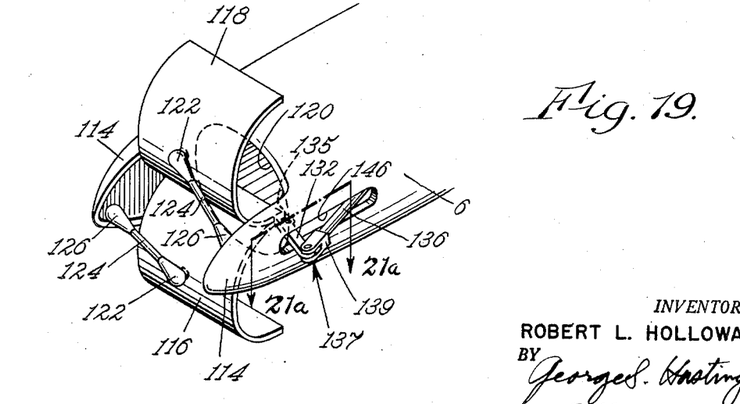
Fig. 19 shows the thrust control mechanism of Fig. 17 in a full reverse thrust position.
Figures 20, 20A:
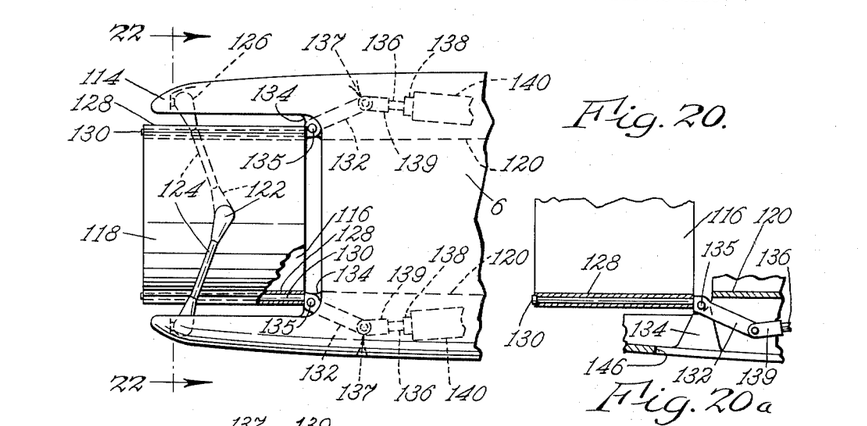
Fig. 20 is a plan view of a single jet nozzle, illustrating the thrust control mechanism of Fig. 17 in forward thrust position.
Fig. 20a is a partial sectional plan view with parts broken away, taken along the lines 20A—20A of Fig. 22.
Figures 21, 21A, 22:
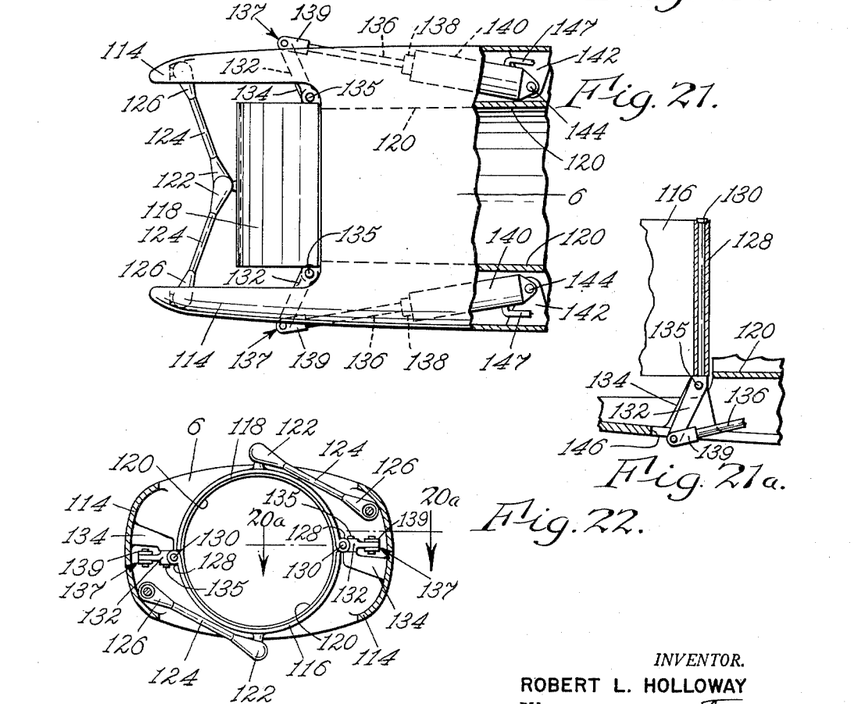
Fig. 21 is a plan view of a single jet nozzle, illustrating the thrust control mechanism of Fig. 17 in reverse thrust position.
Fig. 21a is a partial sectional plan view with parts broken away, taken along the lines 20A—20A, when the thrust controller is in reverse thrust position.
Fig. 22 is an end elevation of the modified single engine thrust control mechanism partly in section, taken on line 22—22 of Fig. 20.

As in the twin engine embodiment, when the deflecting plates 116, 118 are in a reverse thrust position, as shown in Figs. 19 and 21, the flow of gas is completely reversed in direction and passed forwardly in a symmetrical fashion over the upper and lower outer surfaces of jet propulsion engine 6. Of course, the shells of the single engine embodiment may also be moved to any position between full forward and full reverse thrust as desired by the operator, as infinitely variable control over the direction of jet thrust is provided by the invention. For example, when the shells are stationed in a partially unfolded position as shown in Fig. 18, approximately zero thrust is obtained.

While the present invention has been disclosed by means of specific illustrative embodiments thereof, it would be obvious to those skilled in the art that various changes and modifications in the means of operation described or in the apparatus, may be made without departing from the spirit of the invention as defined in the appended claims.

I claim:

1. A thrust controller for a jet propulsion unit including a jet reaction nozzle having an end extension separable from said nozzle, said end extension comprising a plurality of pairs of substantially cylindrical half sections adapted to be separated along one longitudinal edge thereof, each pair of half sections being arranged concentrically and in serial axial alignment with the mouth of said jet nozzle when in a forward thrust position, means for separating and rotating each pair of half sections to position said separated half sections angularly with respect to the longitudinal axis of said nozzle, and means operated in synchronism with said separating and rotating means for simultaneously moving at least one pair of separated half sections forwardly towards the mouth of said nozzle, whereby all of said half sections are disposed athwart the stream of jet gases when in a reverse thrust position.

2. A thrust controller for a jet propulsion unit including a jet reaction nozzle having a tail section separable from said nozzle, said separable tail section comprising a pair of half shells serially spaced in coaxial alignment with said nozzle when in a forward thrust position, each of said shells having one elongated edge hinged to an adjacent shell, a pivoted joint connecting one end of said hinged edge to said nozzle, and means for separating said shells by rotating the shells along said hinged edge and about said pivoted joints, and means for moving said shells into a position with said hinged edge substantially transverse to the line of flow of gases from said nozzle to form a gas dividing wedge, whereby the flow of said gases is angularly deflected and separated into a plurality of discrete paths moving in a direction substantially opposite to the flow of undeflected gases.

3. A thrust controller for a jet propulsion unit including at least one jet reaction nozzle having a tail section separable from said nozzle, said separable tail section including a plurality of separable segments constructed and arranged to define a cylindrical member serially spaced in coaxial alignment with said nozzle when said controller is in a forward thrust position to allow propulsion gases to flow unimpeded therethrough, and means for moving said segments into a position athwart the line of flow of said gases from said nozzle with complementary elongated edges of said segments abutting one another to form a gas dividing wedge, whereby the flow of said gases is angularly deflected and separated into a plurality of discrete paths in a direction substantially opposite the flow of undeflected gases.

4. A thrust controller for a jet propulsion unit including at least one jet reaction nozzle having a tail section separable from said nozzle, said separable tail section including a plurality of separable segments constructed and arranged to define a cylindrical member serially spaced in coaxial alignment with said nozzle when said controller is in a forward thrust position to allow propulsion gases to flow unimpeded therethrough, and actuating means for separating said cylindrical member into discrete segments and moving said segments into the path of said gas stream, and means for maintaining at least one elongated edge of said segment in juxtaposition to a complementary elongated edge of another segment, said juxtaposed edges being disposed substantially transverse to the line of flow of the propulsion gases flowing from said nozzle to form a gas dividing wedge, whereby the flow of said gases is angularly deflected and separated into a plurality of discrete paths moving in a direction substantially opposite to the flow of undeflected gases.

5. A thrust controller for a plurality of adjacently mounted jet propulsion units having ejection nozzles in parallel spaced relationship comprising a plurality of sets of separable segmented end portions of said nozzles, each one of said sets of said segmented end portions being serially spaced in coaxial alignment with a complementary exhaust opening of one of said nozzles when in a forward thrust position, and common actuating means for simultaneously unfolding said sets of separable end portions into discrete segments, said segments having at least one elongated edge connected to a complementary elongated edge of another segment, said common actuating means including means for simultaneously rotating each of said segments into the path of the propulsion gases flowing from said nozzle to dispose said connected edges substantially transverse to the line of flow of said gases to form a gas dividing wedge whereby the flow of gases from each nozzle is angularly deflected and separated into a plurality of discrete paths moving in a direction substantially opposite to the flow of undeflected gases.

6. A thrust controller for a plurality of adjacently mounted jet propulsion units having ejection nozzles in parallel spaced relationship comprising a plurality of sets of separable segmented end extensions of said nozzles constructed and arranged to define a substantially cylindrical member serially spaced in coaxial alignment with an exhaust opening of each of said nozzles when in a forward thrust position, each set of said cylindrical extensions having an end pivotally attached to a rearwardly extending portion of each of said nozzles, and common actuating means for simultaneously unfolding said sets of separable end portions into discrete segments, said segments having at least one elongated edge connected to a complementary elongated edge of another segment, said common actuating means including means for simultaneously rotating each of said segments about its pivoted end into the path of the propulsion gases flowing from said nozzle to dispose said connected edges substantially transverse to the line of flow of said gases to form a gas dividing wedge whereby the flow of gases from each nozzle is angularly deflected and separated into a plurality of discrete paths moving in a direction substantially opposite to the flow of undeflected gases.

7. A thrust controller for a plurality of adjacently mounted jet propulsion units having ejection nozzles in parallel spaced relationship comprising a plurality of separable segmented end extensions of said nozzles, each of said nozzles having an end extension pivotally attached to the gas ejection end thereof, the edges of said segments being in register with edges of adjacent segments when retracted so as to define a substantially tubular nozzle extension disposed in serial coaxial alignment with said nozzle, and common actuating means responsive to a remotely controlled signal for unfolding each of said separable end extensions into discrete connected segments while simultaneously rotating each of said unfolded extensions about its pivoted end into a position transverse to the line of flow of gases from said nozzle with complementary elongated edges of said segments abutting one another to form a gas dividing wedge, whereby the flow of said gases is angularly deflected and separated into a plurality of discrete paths in a direction substantially opposite the flow of undeflected gases.

8. A movable nozzle extension for a jet propulsion unit comprising a pair of semi-cylindrical gas deflecting members serially spaced in coaxial alignment about a gas ejection orifice of said nozzle when in a retracted position to define a substantially cylindrical extension thereof, each of said members having an elongated edge pivotally attached to said nozzle and adapted to be disposed transverse to the path of said gas stream when in an extended position, said edges lying in juxtaposition across the mouth of said nozzle in said extending position to cooperatively form a gas dividing wedge.

References Cited in the file of this patent

UNITED STATES PATENTS

| | | |
|---|---|---|
| 2,551,372 | Haltenberger | May 1, 1951 |
| 2,620,622 | Lundberg | Dec. 9, 1952 |
| 2,637,164 | Robson et al. | May 5, 1953 |

FOREIGN PATENTS

| | | |
|---|---|---|
| 613,989 | Great Britain | Dec. 8, 1948 |

OTHER REFERENCES

"Aircraft Engineering," February 1946, page 55.